(12) United States Patent  
Chuang et al.

(10) Patent No.: US 6,565,071 B2
(45) Date of Patent: May 20, 2003

(54) LIQUID/GAS CONTACTING APPARATUS

(75) Inventors: Karl T. Chuang, Edmonton (CA); Francis William Lemon, Ottawa (CA)

(73) Assignee: AMT International, Inc., Richardson, TX (US)

( * ) Notice: Subject to any disclaimer, the term of this patent is extended or adjusted under 35 U.S.C. 154(b) by 0 days.

(21) Appl. No.: 09/974,528

(22) Filed: Oct. 11, 2001

(65) Prior Publication Data

US 2003/0071375 A1 Apr. 17, 2003

(51) Int. Cl.$^7$ .................................................. B01F 3/04
(52) U.S. Cl. .................................................. 261/114.5
(58) Field of Search ............................ 261/114.1, 114.5

(56) References Cited

U.S. PATENT DOCUMENTS

| | | | | |
|---|---|---|---|---|
| 1,738,386 A | * | 12/1929 | Morrell | 261/114.1 |
| 2,646,977 A | | 7/1953 | Kraft | |
| 3,045,989 A | * | 7/1962 | Kittel | 261/114.1 |
| 4,036,917 A | * | 7/1977 | Slobodyanik | 261/114.1 |
| 4,132,761 A | * | 1/1979 | Mix | 261/114.1 |
| 4,255,363 A | * | 3/1981 | Geiger et al. | 261/114.5 |
| 4,379,736 A | * | 4/1983 | Kendall et al. | 261/114.5 |
| 4,673,464 A | * | 6/1987 | Zeitsch | 261/114.5 |
| 6,003,847 A | | 12/1999 | Lee et al. | |
| 6,267,359 B1 | * | 7/2001 | Stippick | 261/114.5 |

OTHER PUBLICATIONS

Andrew W. Stoley, Subdue Solids in Towers, Chemical Engineering Progress, pp. 95–104, Jan. 1995.

* cited by examiner

Primary Examiner—C. Scott Bushey
(74) Attorney, Agent, or Firm—Francis W. Lemon

(57) ABSTRACT

A liquid/gas contacting apparatus is provided wherein the perforated trays have an upper liquid repellent layer of a fluorocarbon polymer, to increase, and spread, liquid flow over the tray, and a rough underside for bursting any bubbles of any spray there against. Ridges are provided forming chevron patterns between perforations in the trays to deflect liquid towards the casing sides and remove sediment therefrom.

7 Claims, 2 Drawing Sheets

LIQUID/GAS CONTACTING APPARATUS

FIELD OF THE INVENTION

This invention relates to a liquid/gas contacting apparatus.

BACKGROUND OF THE INVENTION

Perforated trays with downcomers are one of the most commonly used internals in industrial columns or towers for contacting a liquid and a gas. In such columns, liquid flows across the trays and down through the downcomers from tray to tray, while gas permeates upwardly through the trays contacting and foaming liquid thereon.

Many of these columns, which may be used for distillation, absorption and stripping operations, involve having solids present in particulate form, see for example, "Subdue Solids in Tower", A. W. Stoley et al, Distillation and Other Industrial Separations, pages 95–104, dated January 1995, published in Chemical Engineering Progress, Stoley et al, center column, lines 25–38, page 99, which states that "a major problem with downcomers is the creation of dead spots near the tower wall, near outlet weirs, and along the tower shell at the bottom of the downcomer".

Various proposals have been made, see, for example, U.S. Pat. No. 2,646,977, dated Jul. 28, 1953, A. T. Lee et al, U.S. Pat. No. 4,749,528, dated Jun. 7, 1988, J. T. Lavin, and U.S. Pat. No. 6,003,847, dated Dec. 21, 1999, A. T. Lee et al, to reduce the tendency of liquid to dwell at the periphery of the tray adjacent the column wall so that distillation is equally effective at the peripheral and central areas.

While these proposals have achieved various degrees of success in avoiding sediment collecting, stagnant zones in the liquid adjacent the column wall, there remains the problem that friction between the liquid and the trays has a marked effect on reducing liquid flow adjacent the column walls. By reducing this friction a greater throughput of liquid through the apparatus would also be achieved.

There is a need for a liquid/gas contacting apparatus wherein the friction between the liquid and the tray is reduced so that the tendency of liquid to dwell adjacent the column wall is reduced, and greater throughput of liquid through the apparatus is also achieved.

Another problem that needs to be addressed, once the friction between the liquid and the tray has been reduced, is that while the flow of liquid across the entire tray has been increased, the fact that the columns, by convention, are upwardly extending cylinders, there is even more of a tendency, because of the reduced friction, for liquid to flow at a greater rate across a central portion of the tray, from one downcomer to the other, rather than along the segments of circle portions adjacent the column walls.

There is also a need for the liquid flow, across a tray of reduced friction, to be more evenly distributed across the width of the tray.

SUMMARY OF THE INVENTION

According to the present invention there is provided a liquid/gas contacting apparatus, comprising,
a) an upwardly extending casing,
b) a series of perforated tray assemblies partitioning the casing at different levels, and having drainage openings, for, in operation, causing liquid descending in the casing to flow across the tray assemblies and be frothed thereon by gas, to be contacted with the liquid, which is ascending in the casing and permeating the perforations, and wherein,
c) each tray assembly comprises,
i) an upper surface layer which is repellent to the liquid, and
ii) an underside, rough, surface layer which is wettable by the liquid.

Preferably, for each tray assembly, liquid deflecting ridges are provided in the upper surface layer, the ridges,
i) lying between perforations,
ii) having an upper surface layer which is repellent to the liquid, and
iii) extending along paths which slope outwardly, in substantially chevron patterns, in a downstream direction for liquid flow, from central portions of the tray assemblies.

Preferably the ridges have sloping sides.

Preferably, each tray assembly comprises a steel plate, a fluorocarbon polymer upper layer forming said upper surface layer and bonded to the plate, and an exposed, rough underside of the steel plate forming the underside, rough surface layer.

The fluorocarbon polymer may be selected from the group consisting of polytetrafluoroethylene, polymers of chlorotrifluoroethylene, fluorinated ethylene-propylene polymers, polyvinylidene fluoride and hexafluoropropylene.

The liquid deflecting ridges may each comprise a steel strip standing on one edge, on, and welded by welds on both sides to the steel plate of the perforated tray assembly, with the welds providing the said sloping sides.

The liquid deflecting ridges may each comprise an upwardly extending deformed portion of the steel plate of the perforated tray assembly.

The perforations may be lined with a surface layer which is repellent to the liquid.

BRIEF DESCRIPTION OF THE DRAWINGS

In the accompanying drawings which illustrate, by way of example, embodiments of the present invention.

DETAILED DESCRIPTION OF THE PREFERRED EMBODIMENTS

Figure 1:
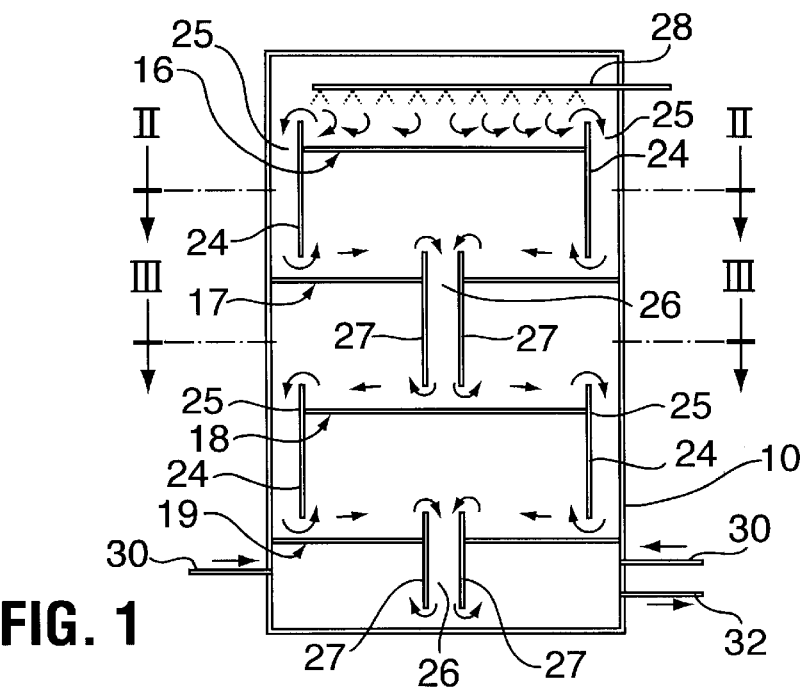
FIG. 1 is a diagrammatic side view of a liquid/gas contracting apparatus.

In FIGS. 1 to 4, there is shown, a liquid/gas contacting apparatus, comprising,
a) an upwardly extending casing 10,
b) a series of perforated tray assemblies, generally designated 16 to 19, partitioning the casing 10 at different levels, and having drainage openings, 25 for tray assemblies 16 and 18, and 26 for tray assemblies 17 and 19, for, in operation, causing liquid descending in the casing 10 to flow across the tray assemblies 17 to 19, as shown by avows in FIG. 1, and be frothed thereon and be contacted therewith, by gas which is ascending in the casing 10 and permeating the perforations 22 (FIGS. 2 to 4), and wherein c) each tray assembly 16 to 19 comprises, a steel plate 11 having,
   i) an upper surface layer 12 (FIG. 4) which is repellent to the liquid, and
   ii) an underside, rough, surface layer 14 which is wettable by the liquid.

Conventional downcomers 24 for tray assemblies 16 and 18, and 27 for tray assemblies 17 and 19, are provided, together with liquid supplying and distributing means 28, gas supplies 30, and treated liquid withdrawal means 32.

Figure 2:
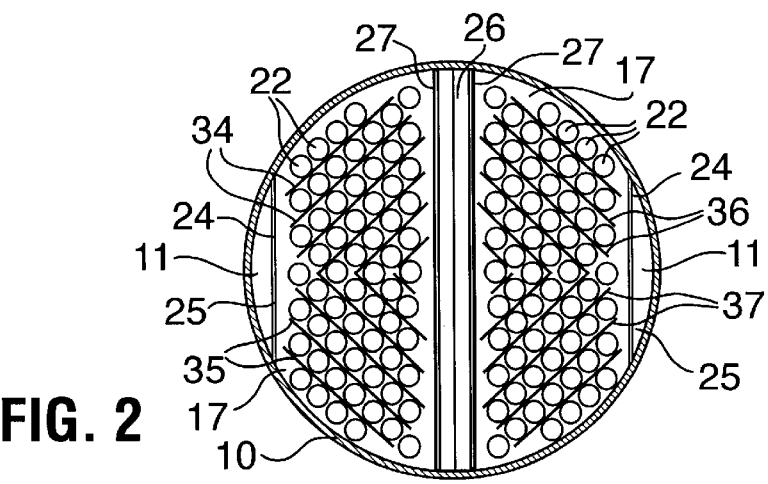
FIG. 2 is a sectional plan view along II—II, FIG. 1.
Figure 3:
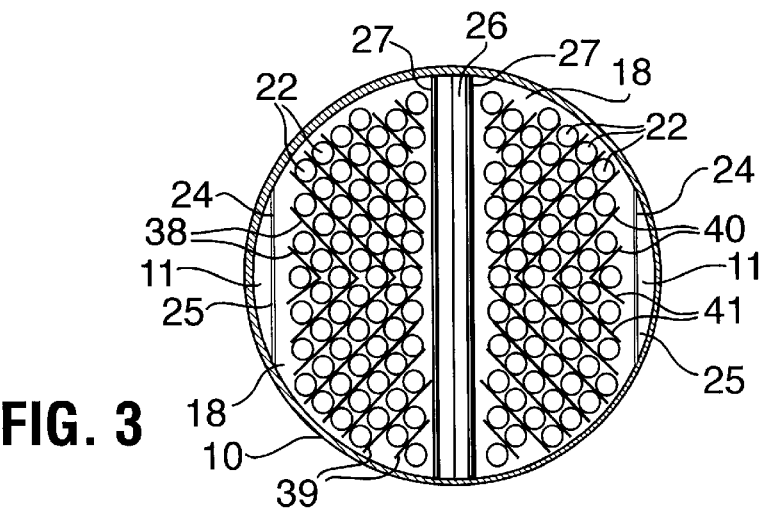
FIG. 3 is a similar view to FIG. 2, but along III—III, FIG. 1.

In this embodiment, for each tray assembly 16 to 19, liquid deflecting ridges, designated 34 to 37 (FIGS. 2 to 4) for tray assemblies 16 and 18, and designated 38 to 41 for tray assemblies 17 and 19, are provided in the upper surface layer 12, the ridges 34 to 41,
   i) lying between the perforations 22,
   ii) having an upper surface layer 21 which is repellent to the liquid, and
   iii) extending, as shown in FIGS. 2 and 3, along paths which slope outwardly in substantially chevron-like patterns, in a downstream direction for liquid flow, from central portions of the tray assemblies 16 to 19.

The liquid deflecting ridges 34 to 41 have sloping sides 42 and 43.

Figure 4:
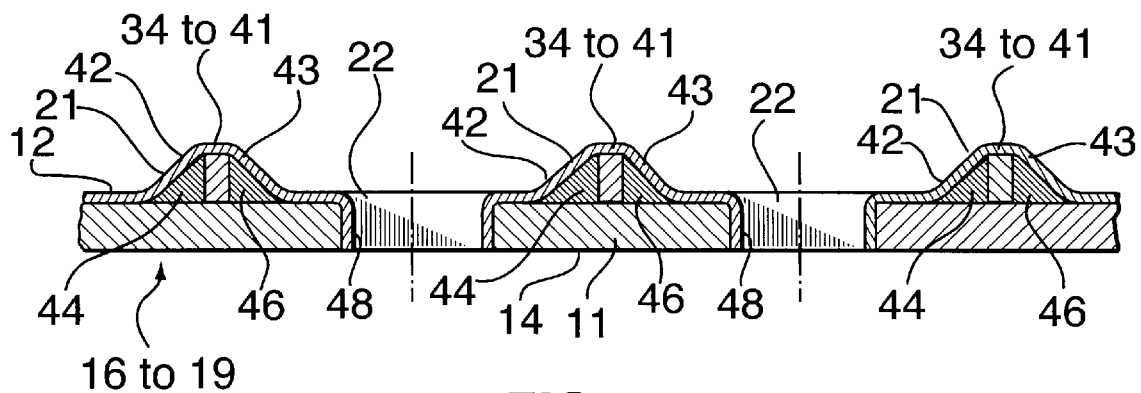
FIG. 4 is an enlarged, sectional side view of a portion of a perforated plate assembly shown in FIGS. 1 to 3.

Referring to FIG. 4, the liquid deflecting ridges 34 to 41, each comprises a steel strip which is standing on one edge on, and welded by welds 44 to 46, to the steel plate 11. The welds 44 and 46 provide the sloping sides 42 and 43. The height of the ridges is chosen for them to deflect liquid.

Figure 5:
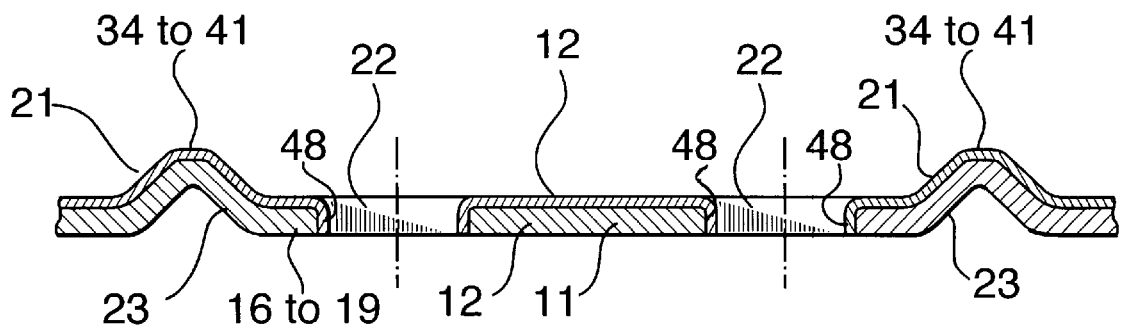
FIG. 5 is a similar view to FIG. 4, but of a different embodiment.

In FIG. 5, similar parts to those shown in FIGS. 1 to 4 are designated by the same reference numerals and the previous description is to relied upon to describe them.

In FIG. 5, the liquid deflecting ridges 34 to 41 each comprise an upwardly deformed portion of the steel plate 11.

In this embodiment there are two rows of perforations between each pair of ridges 34 to 41.

The upper surface layer 12 is preferably a fluorocarbon polymer selected from polytetrafluoethylene, polymers of chlorotrifluoroethylene, fluorinated ethylene-propylene polymers, polyvinylidene fluoride and hexafluoropropylene, bonded to the steel plate 11 and the ridges 34 to 41.

The underside, rough, surface layer 12, can be the untreated, exposed underside surface of the steel plate 11, or it may compromise a sand blasted underside surface of the steel plate 11.

Preferably, the perforations 22 are lined with a surface layer 48 (FIGS. 4 and 5) which is repellent to the liquid.

In operation, liquid is distributed over the perforated tray assembly 16 by the means 28, while gas is fed to the underside of the perforated tray 19.

The liquid flows across the tray assemblies 16 to 19 along the path indicated by the arrows in FIG. 1. As the liquid flows across the tray assemblies 16 to 19, the gas flows upwardly through the perforations 22 and froths the liquid travelling over them. Treated liquid is removed from the casing 10 by the means 32.

The liquid repellent, upper surface layer 12, on the perforated tray assemblies 16 to 19, reduces friction between the liquid and the tray assemblies 16 to 19, compared to the underside surface layer 14 of tray assemblies 16 to 19 which are not provided with the layer 12. This reduction in friction causes the liquid to flow at a faster rate across the perforated tray assemblies 16 to 19, and to spread and flow more evenly over the perforated tray assemblies 16 to 19. These effects result in a greater throughput of liquid through the apparatus, a greater flow of liquid in areas adjacent the casing 10, and less build up of sediment adjacent the casing 10.

The increased flow of liquid across the perforated tray assemblies 16 to 19 allows for a greater volume of gas to be fed by the means 30, and this in turn leads to more frothing on the perforated tray assemblies. If the frothing, in combination with the faster flow rate, are such that froth spray occurs against the underside of a tray assembly 16 to 19 anywhere, then the rough surface layer 14 will accelerate the bursting of bubbles in this froth causing liquid to flow down the froth, thus increasing gas/liquid contact.

Furthermore, turbulence caused by the rough surface layer 14 reduces the possibility of liquid droplets being entrained in gas flowing upwardly through the perforations 22. The water repellent linings 48 in the perforations also help in avoiding this.

While the liquid repellent, upper surface layer 12 causes the liquid to spread and flow more evenly over the perforated tray assemblies 16 to 19, there is still room for improving the more even distribution of flow across the perforated tray assemblies with an eye to further reducing the build up of sediment adjacent the casing 10.

The increased flow of liquid across the tray assemblies 16 to 19 allows the use of liquid deflecting ridges 34 to 37, which deflect frothing liquid from central zones of the tray assemblies 16 to 19 towards both sides of the casing 10.

Deflecting frothing liquid in this manner sweeps the portions of the tray assemblies 16 to 19, that are adjacent the casing 10, removing sediment from these areas, as well as more evenly distributing the flow of liquid on the tray assemblies 16 to 19.

Preferably the liquid deflecting ridges 34 to 37 have sloping sides for more even distribution of liquid over the tray assemblies 16 to 19.

The liquid deflecting ridges 34 to 37 may, in some embodiments of the present invention be discontinuous to provide gaps, through which liquid may flow, to sweep the valleys, between the liquid deflecting ridges 34 to 37, clean of any sediment that may become deposited in them. Preferably, the gaps in adjacent ridges 34 to 37 are staggered.

In other embodiments of the present invention, the liquid deflecting ridges 34 to 37 are only provided between some of the rows of the perforations 22, for example, the liquid deflecting ridges are only provided in every fourth row.

We claim:

1. A liquid/gas contacting apparatus, comprising,
   a) an upwardly extending casing,
   b) a series of perforated tray assemblies partitioning the casing at different levels, and having draining openings for, in operation, causing liquid descending in the casing to flow across the tray assemblies and be frothed theron by gas to be contacted with the liquid, which is ascending in the casing and permeating the perforations, and wherein,
   c) each tray assembly comprises,
      i) an upper surface layer which is repellent to the liquid, and
      ii) an underside, rough, surface layer which is wettable by the liquid.

2. An apparatus according to claim 1, wherein, for each tray assembly, liquid deflecting ridges are provided, in the upper surface layer, the ridges,
   i) lying between perforations,
   ii) having an upper surface layer which repellent to the liquid, and iii) extending along paths which slope outwardly, in substantially chevron patterns, in a downstream direction for liquid flow, from central portions of the tray assemblies.

3. An apparatus according to claim 2, wherein the ridges have sloping side.

4. An apparatus according to claim 2, wherein, each tray assembly comprises a steel plate, a fluorocarbon polymer upper layer forming said upper surface layer and bonded to the plate, and an exposed, rough underside of the steel plate forming the underside, rough surface layer.

5. An apparatus according to claim 4, wherein, the fluorocarbon polymer is selected from the group consisting of polytetrafluoroethylene, polymers of chlorotrifuoroethylene, fluorinated ethylene-propylene polymers, polyvinylidene fluoride and hexafluoropropylene.

6. An apparatus according to claim 4, wherein, the liquid deflecting ridges each comprises a steel strip standing on one edge on, and welded by welds on both sides to the steel plate of the perforated tray assembly, with the welds providing the said sloping sides.

7. An apparatus according to claim 4, wherein, the liquid deflecting ridges each comprises an upwardly deformed portion of the steel plate.

* * * * *